Sept. 4, 1945.  J. W. RICHARDS  2,384,341
METHOD OF ATTAINING REALISTIC ANIMATION FOR PHOTOGRAPHIC PURPOSES
Filed May 14, 1942
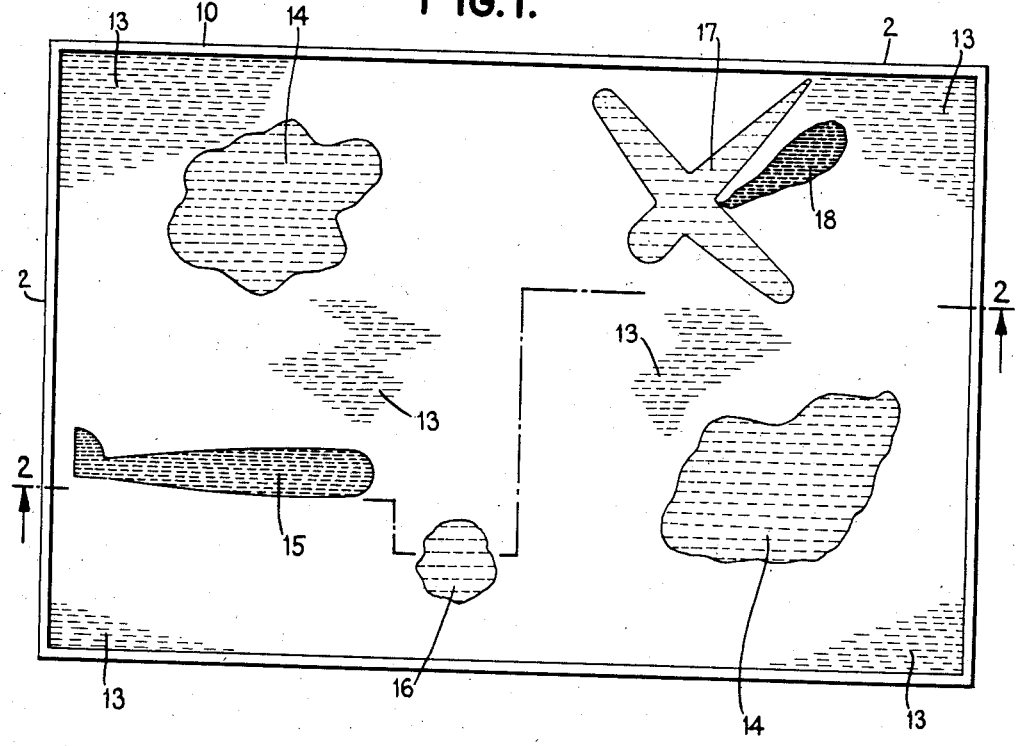
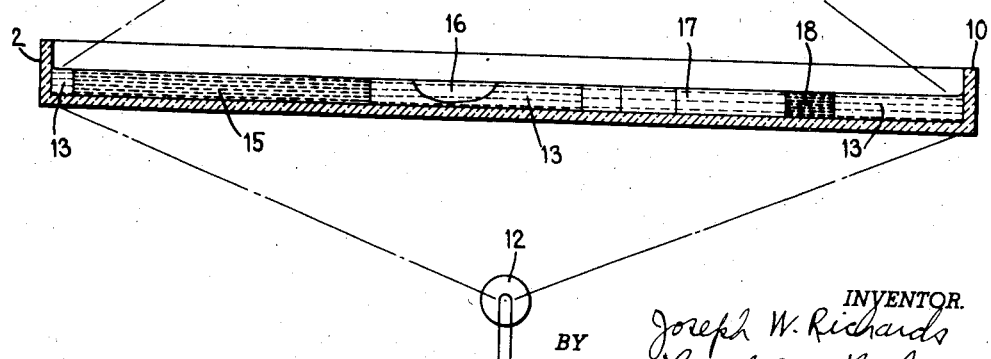
INVENTOR.
Joseph W. Richards
BY Lemkin & Woolsey
ATTORNEYS Patented Sept. 4, 1945

2,384,341

UNITED STATES PATENT OFFICE 2,384,341

METHOD OF ATTAINING REALISTIC ANIMATION FOR PHOTOGRAPHIC PURPOSES

Joseph W. Richards, New York, N. Y.

Application May 14, 1942, Serial No. 442,896

3 Claims. (Cl. 88—16)

My present invention relates to a method of artificially effecting animation and realism for the production of still and moving pictures and has for its main object the provision of a method of the general character indicated which requires a minimum of apparatus, which apparatus is easy and economical to assemble and operate and which is admirably adapted to the carrying out of the functions hereinafter more fully set forth.

In the accompanying specification I shall describe and in the annexed drawing show an illustrative embodiment of the means employed for the practice of the method of the present invention. It is, however, to be clearly understood that I do not wish to be limited to the specific application of the present method herein shown and described for purposes of illustration only inasmuch as changes therein may be made without the exercise of invention and within the scope of the claims hereto appended. Nor do I wish to be limited to the specific details of the method herein described for purposes of illustration only inasmuch as changes therein may likewise be made within the scope of the present invention.

In the accompanying drawing,

Figure 1 is a top plan view of one assembly of apparatus by means of which one form of the method of the present invention may be carried out; and Figure 2 is a longitudinal sectional view of the same taken along line 2—2 of Figure 1.

Before describing the present invention in detail I deem it advisable briefly to refer to the prior art in the field to which the present invention relates, to point out the disadvantages thereof, and the manner in which the present invention overcomes the same.

In the main there has been used previously three systems for the production of animated pictures such as cartoons and the like. In the first system, the objects to be photographed are silhouetted so that the image striking the lens of the camera was black and white only, it being impossible with this system to attain any intermediate tones. The limitations of such a system are obvious.

Another system required the laborious drawing of each change of position of the character being photographed or their relative positions with respect to each other. This, of course, required the employment of a large number of artists so that the process became very costly.

In the third system, in order to attain contrast between two objects, where contrast was necessary in order to provide identification, one object was made opaque and it was placed upon a background, usually made of glass, in which there was cut out the outline of a second object. With such a system the opaque object appeared black to the camera and the cut-out outline, which let light through from the rear thereof, appeared white. However, in order to show relative movement between the two objects it was necessary to constantly shift the background and these being rather large plates, made for considerable inconvenience to say nothing of the cost of preparing a large number of different backgrounds as the scene changed. By means of the present invention I have overcome all of these disadvantages and have provided a very simple and effective method for artificially attaining realistic animation at very little cost.

Referring now more in detail to the present invention with particular reference to the drawing, the numeral 10 designates a shallow rectangular tray, preferably made of glass or some other transparent or translucent material. The tray is positioned intermediate a camera 11 disposed above the same, and a source of light 12 disposed beneath the same.

In describing the present invention, I shall assume that it is desired to depict an air battle between two planes.

First of all it is necessary to prepare a background. I shall assume that the background is the sky and I shall further assume that it is a clear day with scattered clouds.

The tray is partially filled with water 13 into which there is introduced a few drops of ink or pigment in order to give the same color and render it translucent rather than transparent. Next, I introduce into the tinted water, at scattered points, a few drops of some very slowly miscible substance such as honey or syrup, with which there has been mixed, if it is found necessary, some substance which will render the same translucent, but to a much greater degree than the tinted water so that when light shines through the same, these blobs or drops, designated by reference character 14, will appear to the camera considerably lighter in shade than the surrounding area which represents the sky. We now have a background comprising sky and scattered clouds.

I now take a cut-out, which may be made of an opaque plastic material, in the shape of, let us assume, a bombing plane. This cut-out or silhoutte, designated by refrence character 15, should be of the same thickness as the depth of the liquid 13. It is placed in the water and rests on the bottom of the tray 10. If it is desired to show the plane moving, with the light source 12 on, a photographic exposure is made after which the cut-out can be moved in the tray to a different relative position with respect to the clouds 14 and additional photographic exposure made. Obviously, the projection of such a film will give the illusion of movement of the plane across the sky.

I shall assume that the plane, having arrived over enemy territory, will be subjected to anti-aircraft fire. This may be artificially attained as follows: I drop into the tinted water representing the sky, at scattered points about the plane 15, a drop or two 16 of a liquid which is readily miscible with water but which when first striking the same will disperse the pigmentation therein so as to render the specific points where this liquid falls into the water, more transparent than the surrounding tinted water. Such a liquid is alcohol. These drops gradually become completely blended into the background but when photographed there is attained the illusion of explosions which, of course, gradually become dissipated. Obviously, as the alcohol is dropped into the water and while the dispersion and subsequent dissipation takes place a series of photographic exposures are made.

I shall now assume that the plane 15 is to be attacked by another plane. There is placed in the water a cut-out made of a transparent or translucent material, the cut-out having the shape of a plane. This has been designated by reference character 17. This cut-out is transparent or translucent or in any event less opaque than the cut-out 15 and it displaces the water within its physical bounds so that it will appear to the camera as an object of contrasting tone to the sky, the clouds and any other object that may be within the scene. By making a series of photographic exposures and moving the plane 17 toward the plane 15 there will be attained the illusion of the two planes coming toward each other. When the plane 17 has been moved into an appropriate position, the illusion of exploding shells from a cannon carried by the plane can be attained as hereinbefore described in connection with anti-aircraft fire. Should it be desired to show the plane 17 as having itself been hit by its opponent and that it is to crash to earth, leaving a trail of smoke, this can be done by partially blotting out the plane during its flight downwardly by increasing the depth of water in the tray. Obviously, the plane will appear to be blended into the background as if part of it had possibly been partially shot away; and there can be added to this illusion, that of a trail of smoke by introducing into the water a few drops 18, immediately adjacent the plane, of alcohol which has been tinted to a tone somewhat darker than that of the sky background.

This completes the description of the present invention and also of one method of utilizing the same. Obviously, different objects such as battleships upon the sea can be used in place of those specifically described and an unending variety of movements and illusions can be created by the method hereinabove set forth.

It will be obvious to those skilled in the art to which the present invention relates that by reason of the present invention I provide a system which is capable of artificially attaining animation and realism in a manner much simpler than heretofore possible and at a much lower cost.

Other objects and advantages will readily occur to those skilled in the art to which the present invention relates.

What I claim as my invention is:

1. The method of artificially effecting realistic animation which comprises the steps of disposing, intermediate a light source and camera, a background medium, intermittently treating said background medium to simulate changing surroundings, displacing at least a portion of said treated background medium with a substance of contrasting opacity, moving said substance into a multiplicity of different positions within said treated background medium to successively display the same against differently appearing backgrounds, making a photographic record of the whole while said substance is in each of said multiplicity of different positions, and successively viewing said records to obtain the illusion of the movement of said substance across said background.

2. The method of artificially effecting realistic animation which comprises the steps of disposing, intermediate a light source and camera, a transparent liquid background medium, tinting said background medium to render the same translucent, intermittently treating said tinted background medium to simulate changing surroundings, displacing at least a portion of said tinted background medium with a substance of contrasting opacity, moving said substance into a multiplicity of different positions within said tinted background medium to successively display the same against differently appearing backgrounds, making a photographic record of the whole while said substance is in each of said multiplicity of different positions, and successively viewing said records to obtain the illusion of the movement of said substance across said background.

3. The method of artificially effecting realistic animation which comprises the steps of disposing, intermediate a light source and camera, a background medium, intermittently treating said background medium to simulate changing surroundings, displacing at least a portion of said treated background medium with a substance of contrasting opacity, moving said substance into a multiplicity of different positions within said treated background medium to successively display the same against differently appearing backgrounds, temporarily dispersing at least a portion of said treated background medium by the introduction therein of a material capable of becoming slowly blended therewith to create a violent but gradually subsiding disturbance in said surroundings, making a photographic record of the whole while said substance is in each of said multiplicity of different positions and while said dispersing material is being introduced into and becoming blended in said treated background medium, and successively viewing said records to obtain the illusion of the movement of said substance across said background in the presence of said violent and gradually subsiding disturbance.

JOSEPH W. RICHARDS.